Jan. 7, 1930.  F. H. PRESCOTT  1,742,874

PRIME MOVER DYNAMO PLANT

Filed Sept. 14, 1925

Inventor

Frank H. Prescott

By Spencer Sewall and Hardman his Attorneys

Patented Jan. 7, 1930

1,742,874

UNITED STATES PATENT OFFICE

FRANK H. PRESCOTT, OF ANDERSON, INDIANA, ASSIGNOR TO GENERAL MOTORS CORPORATION, OF ANDERSON, INDIANA, A CORPORATION OF DELAWARE

PRIME-MOVER DYNAMO PLANT

Application filed September 14, 1925. Serial No. 56,160.

This invention relates to prime mover dynamo plants in which the dynamo is belt-connected to the engine, and particularly to mounting upon an internal-combustion engine a generator which is driven by the engine through power-transmitting connections including a belt or chain connected with the generator shaft.

One of the objects of the present invention is to provide simple means for mounting a dynamo, and providing for tightening the driving belt or chain by movement of the dynamo shaft sidewise with respect to the engine frame.

Further objects and advantages of the present invention will be apparent from the following description, reference being had to the accompanying drawings, wherein a preferred form of the present invention is clearly shown.

Figure 1:
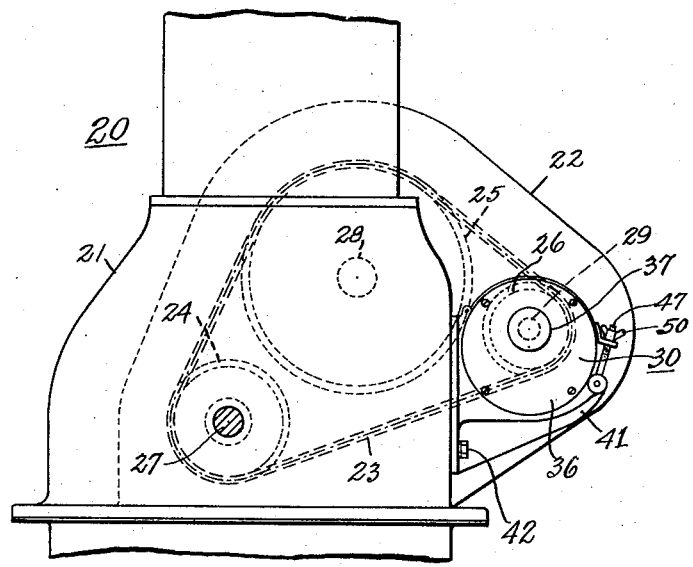
Fig. 1 is a fragmentary view of an internal-combustion engine, looking at the back of the housing for the sprocket-and-chain drive between the various shafts of the engine, and showing an end view of a generator and mounting therefor, constructed in accordance with the present invention.
Figure 2:
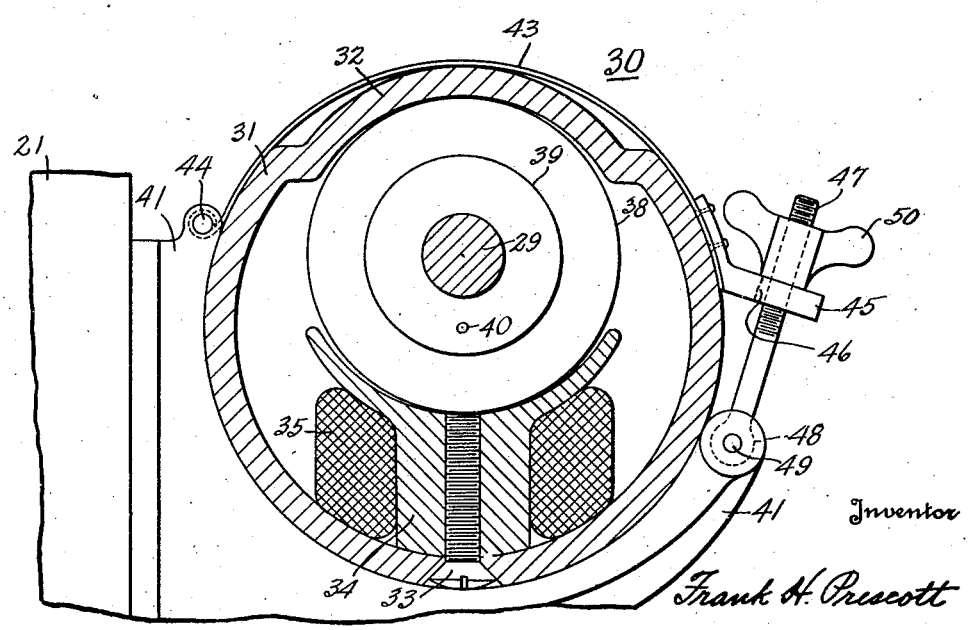
Fig. 2 is a fragmentary end view of the mounting bracket shown in Fig. 1, the generator being shown in section.

20 designates an internal-combustion engine having a crankcase 21 and a gear housing 22 which encloses a belt or sprocket chain 23 which connects gears 24, 25 and 26, respectively. Gear 24 is driven by the engine crankshaft 27; gear 25 drives the engine cam shaft 28; and gear 26 is mounted on the shaft 29 of a generator 30. Generator 30 has a field frame 31 which is formed to provide a consequent pole 32. A screw 33 attaches to the frame 21, a pole piece 34 surrounded by a field winding 35. The field frame 31 supports end frames, one of which is shown at 36 in Fig. 1. Each end frame carries a bearing for the shaft 29. One of the bearings is shown at 37 in Fig. 1. The shaft 29 supports an armature 38 and a commutator 39. The construction of the dynamo described, causes the shaft 29 to be located eccentrically with respect to the axis of curvature of the cylindrical frame 31. This axis of curvature is designated by a small circle 40 in Fig. 2.

The dynamo 30 is supported upon a bracket or cradle 41 attached to the engine crankcase 21 by screws 42. The surface of the cradle 41 which receives the field frame 31 is cylindrical and of the same radius of curvature as the field frame 31. It is apparent from Fig. 1 that if the frame 31 is rotated clockwise, as viewed in Fig. 1, the shaft 29 will be moved toward the right of the drawing and away from the shafts 27 and 28, in order to tighten the belt or chain 23. To loosen the belt, the dynamo frame 31 is rotated counter-clockwise. The frame is maintained in the desired position for adjusting the tension of the belt 23, by a clamp which includes a strap 43 having one end attached to a hinge pin 44 carried by the bracket 41. The other end of the strap 43 carries a clip 45 having a notch 46 through which extends the threaded shank 47 of a bolt having an eye-head 48, through which passes a pin 49, carried by the cradle 41. By screwing down a nut 50, cooperating with the threaded shank 47, the frame 31 will be securely clamped between the cradle 41 and the strap 43.

While the form of embodiment of the invention as herein disclosed, constitutes a preferred form, it is to be understood that other forms might be adopted, all coming within the scope of the claim which follows.

What is claimed is as follows:

A dynamo electric machine and mounting therefor, comprising in combination, a tubular cylindrical body providing a field frame, an armature carried by a shaft supported by the frame eccentric to the axis thereof, a cradle having a cylindrical surface for receiving the outer cylindrical surface of the tubular frame member and a clamping band attached at one end to the cradle and extending about the outer cylindrical surface of the tubular frame member, and means for tightening the band around the frame member in order to secure the same to the cradle in a desired position of adjustment.

In testimony whereof I hereto affix my signature.

FRANK H. PRESCOTT.